United States Patent Office 3,372,681
Patented Mar. 12, 1968

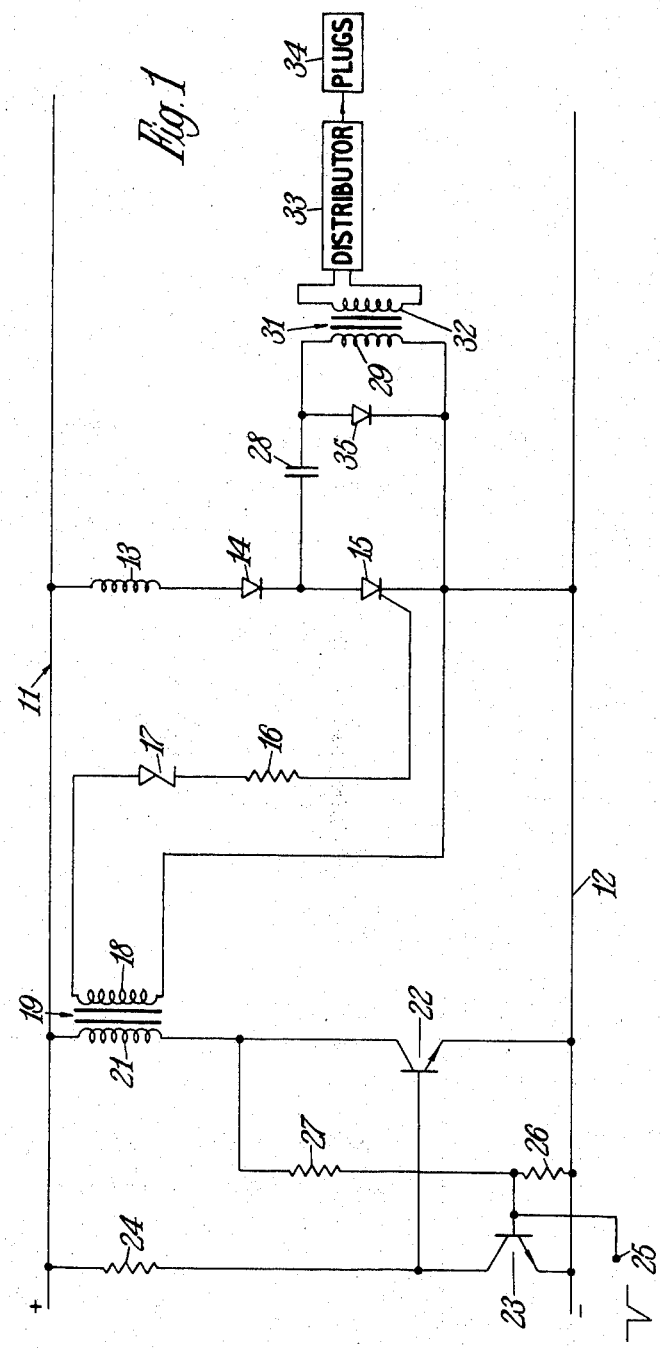

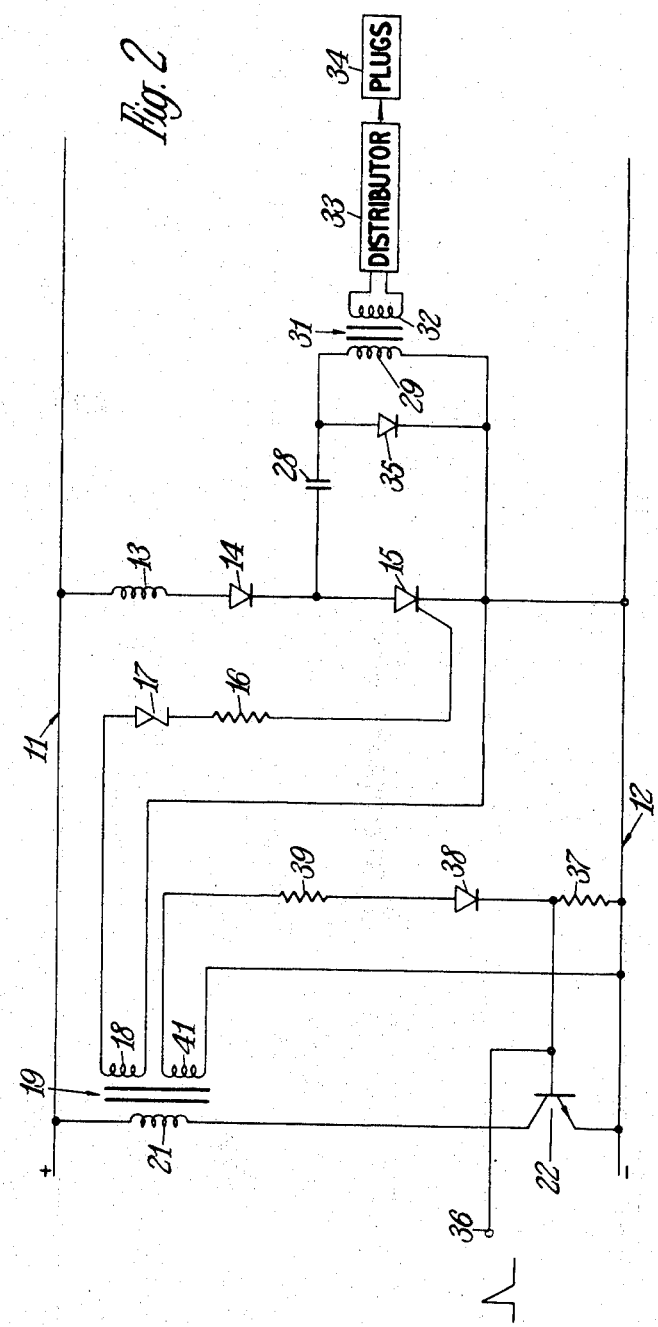

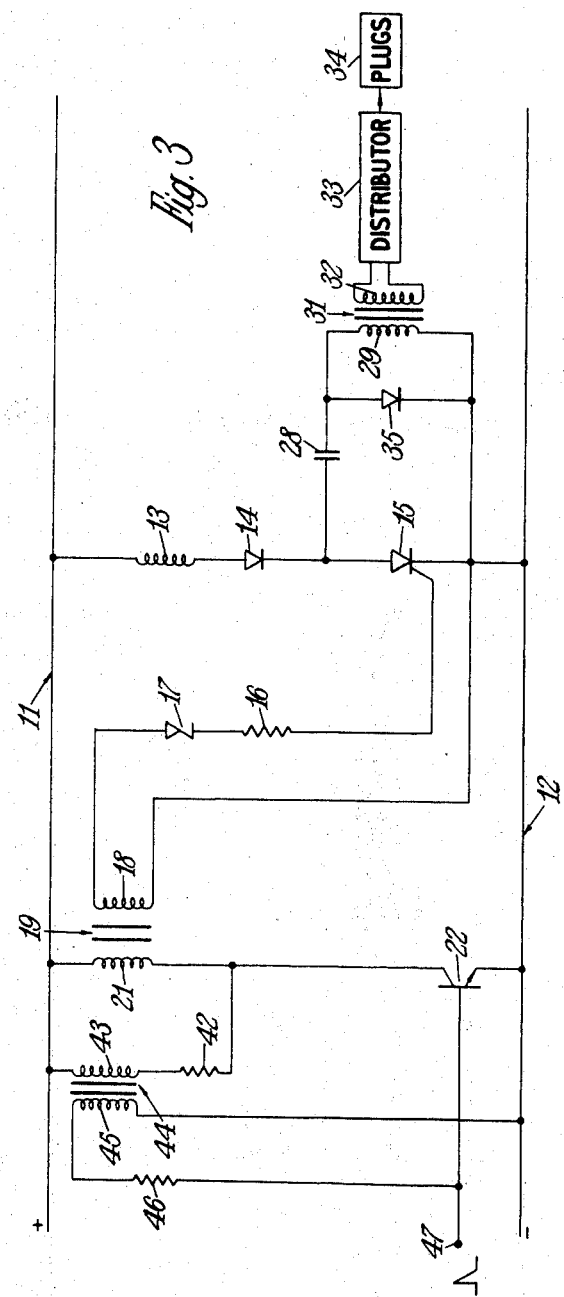

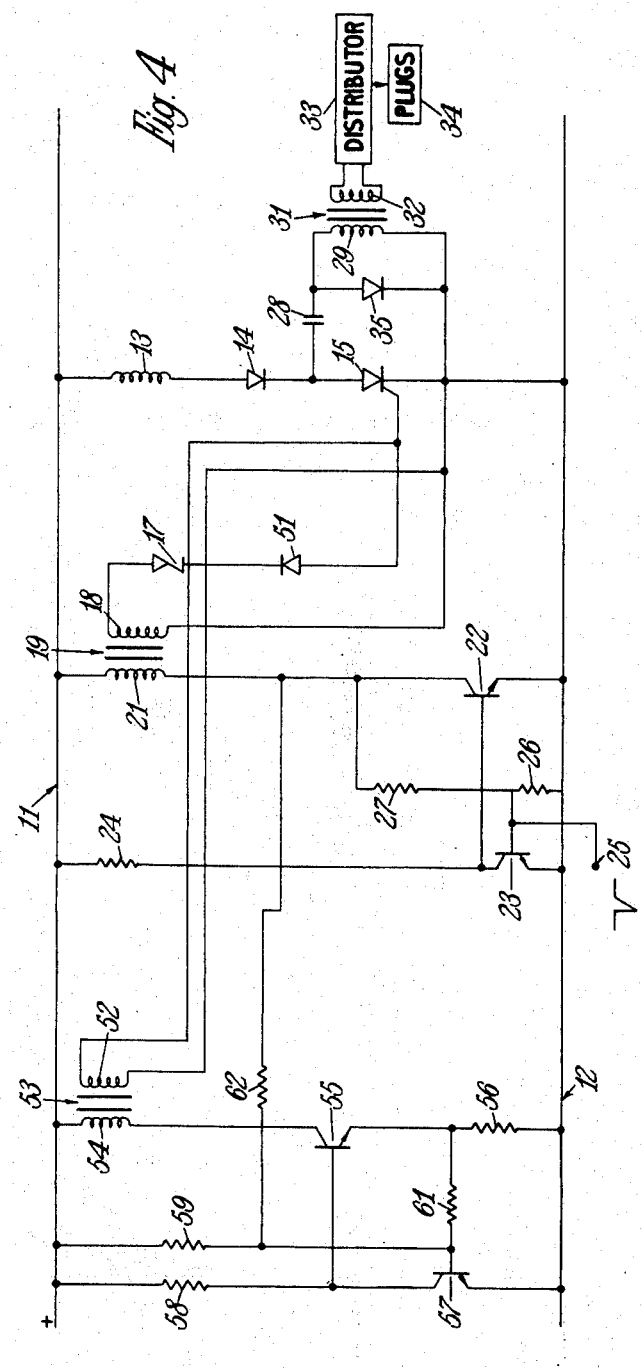

3,372,681
SPARK IGNITION SYSTEMS
Brian Leslie Phillips and Derek Stanley Adams, Birmingham, England, assignors to Joseph Lucas (Industries) Limited, Birmingham, England, a British company
Filed Mar. 8, 1966, Ser. No. 532,629
Claims priority, application Great Britain, Mar. 10, 1965, 10,109/65
15 Claims. (Cl. 123—148)

ABSTRACT OF THE DISCLOSURE

In a spark ignition system for an internal combustion engine, an inductor is connected in series with a switch across a battery. The switch is closed at periodic intervals by the engine, and when it closes energy is stored in the inductor, this energy later being used to produce a spark at a plug of the engine in timed relationship thereto. Associated with the series circuit a switch and inductor is a saturable transformer in the primary winding of which current flows at the same time as current flows through the series circuit. When the saturable transformer saturates, the switch is turned off, and so the current flowing in the series circuit is always turned off at a predetermined value, so that the energy stored in the inductor each time the switch closes is constant.

---

This invention relates to spark ignition systems for internal combustion engines.

In its broadest aspect, the invention resides in a spark ignition system in which energy derived from a battery is stored in an inductor and then used to produce a spark, the amount of energy stored being determined by a saturable transformer the primary winding of which is fed with current at the same time as the inductor, and which stops current flow from the battery to the inductor when the transformer saturates.

In its preferred form, the invention makes use of a semi-conductor device known as a gate controlled switch. This device is similar to the semi-conductor device called a controlled rectifier, but has the additional property that it can be switched off by a negative current flowing between its gate and cathode, whereas a conventional controlled rectifier can only be switched off by a reverse voltage between its anode and cathode. The gate controlled switch can handle currents of the same magnitude as the controlled rectifier, and should not be confused with devices such as the trigistor which operates in a similar manner, but can handle only very small anode-cathode currents. The gate controlled switch is one example of a semi-conductor switch, which term is hereby defined to mean a semi-conductor device having a control terminal, and a pair of main terminals, signals applied to the control terminal determining whether or not the switch conducts. In the case of a gate controlled switch, the main terminals are the anode and cathode and the control terminal is the gate. If a transistor is used, the collector and emitter constitute the main terminals and the base the control terminal. It will be noted that the definition excludes, for example, a controlled rectifier, even though a controlled rectifier has the necessary three terminals, because although the gate signal applied to a controlled rectifier initiates conduction, turning off of the controlled rectifier can only be effected by reversing its anode-cathode voltage.

Bearing in mind the above definition, the invention in a more restricted sense resides in a spark ignition system including an inductor, a diode and a semi-conductor switch connected in a series circuit so that energy is stored in the inductor when the switch is on, a capacitor connected in a series circuit across the main terminals of the switch, the capacitor being connected in circuit with the inductor so that when the switch is turned off energy is transferred from the inductor to the capacitor, discharge of the capacitor through the inductor being prevented by the diode, means whereby a spark is produced as a result of the capacitor discharging through the switch when the switch is turned on, means operable in timed relationship to the engine for turning the switch on by applying a signal to its control terminal when a spark is required, a saturable transformer having its primary winding connected so that current flows in the primary winding when the switch is on, and means operable when the transformer saturates for turning the switch off by varying the signal applied to its control terminal.

In the accompanying drawings, FIGURES 1 to 4 respectively are circuit diagrams illustrating four examples of the invention.

Referring to FIGURE 1, there are provided positive and negative lines 11, 12 which in use are connected to the vehicle battery, and are interconnected through a series circuit including an inductor 13, a diode 14, and a gate-controlled switch 15. The gate and cathode of the switch 15 are interconnected through a resistor 16 and a Zener diode 17 in series with the secondary winding 18 of a saturable transformer 19, the primary winding 21 of which has one end connected to the line 11 and its other end connected to the collector of a transistor 22, the emitter of which is connected to the line 12 and the base of which is connected to the collector of a transistor 23. The transistor 23 has its emitter connected to the line 12, its collector connected through a resistor 24 to the line 11 and its base connected to a terminal 25, and, through resistors 26, 27 respectively, to the line 12 and the collector of the transistor 22. Preferably, the transformer 19 has a core formed with an air gap which ensures that an output pulse having a steep slope will be obtained when the transformer saturates.

The anode and cathode of the switch 15 are interconnected through a capacitor 28 in series with the primary winding 29 of an ignition transformer 31, the secondary winding 32 of which is connected through a distributor 33 to the plugs 34 of the engine in turn. The winding 29 is bridged by a diode 35.

In order to understand the operation of the circuit, assume that the switch 15 is off and the capacitor 28 is charged. In these circumstances the transistors 23, 22 are on and off respectively, and when a spark is required a negative signal is applied, by any convenient known means operated by the engine, to the terminal 25. This signal turns the transistor 23 off and the transistor 22 on, and the resultant E.M.F. induced in the winding 18 by current flowing in the winding 21 applies positive gate-cathode current to the switch 15 to turn it on, whereupon the capacitor 28 discharges through the winding 29 and switch 15 to produce the spark.

While the switch 15 is on, current builds up in the winding 21 until the transformer saturates. At this point, the collector-emitter current of the transistor attempts to rise to a value such that the base current of the transistor 22 cannot maintain the transistor bottomed. As a result the voltage across the transistor 22 rises and the transistors 23, 22 are turned on and off respectively. The interruption in current in the winding 21 causes a negative gate-cathode current to be applied to the switch 15 to turn it off. The Zener diode absorbs excess energy produced by the winding 18 after the switch 15 has been turned off.

While the switch 15 is on, energy is stored in the inductor 13, and when the switch 15 is turned off this energy is transferred to the capacitor 28 by way of the diode 35, where it is retained by the presence of the diode 14 in readiness for the next cycle. It will be appreciated that the capacitor 28 is charged to a voltage considerably in excess of the battery voltage.

Because the current flowing in the inductor 13 is always broken when the transformer 19 saturates, this current will be substantially independent of battery voltage although of course the time taken for this current to be attained will vary with battery voltage.

Referring now to FIGURE 2, it will be seen that the components 23, 24, 25, 26, 27 in FIGURE 1 have been omitted. The base of the transistor 22 is now connected to a terminal 36 to which positive signals are applied when a spark is required, and in addition connections are made from the base to the line 12 through parallel circuits one of which contains a resistor 37 and the other of which contains a diode 38, a resistor 39 and an additional winding 41 on the transformer 19.

The operation is basically similar to that of FIGURE 1 except for the way in which the transistor 22 is switched on and off. When a spark is required, a positive signal at the terminal 36 turns the transistor 22 on and energy is fed back to the base of the transistor 22 by way of winding 41 until the transformer 19 saturates, at which point base drive to the transistor 22 is removed. The diode 38 is only necessary if the transistor 22 cannot withstand the reverse base-emitter voltage which would otherwise be applied when the transistor 22 turns off. The resistor 37 provides a path for stored charge in the base of transistor 22 on turn-off. An alternative position for the diode 38 is between the emitter of the transistor 22 and the line 12.

In the further modification of FIGURE 1 shown in FIGURE 3, the components 23, 24, 25, 26, 27 are omitted and the transformer 19 is not a saturating transformer. However, connected in parallel with the winding 21 is a resistor 42 in series with the primary winding 43 of a saturating transformer 44, the secondary winding 45 of which has one end connected to the line 12 and its other end connected through a resistor 46 to the base of the transistor 22, the base being further connected to a terminal 47.

The operation is identical to FIGURE 2 except that the feedback energy to the base of the transistor is by way of the saturating transformer 44. This modification permits the use of a smaller saturating transformer which may well be economically worthwhile even though a normal transformer 19 is required in addition.

In each of FIGURES 1 to 3, the inductor 13 and the primary winding of the saturating transformer are connected in series circuits across the lines 11, 12. These series circuits contain different components, and because the peak current in the saturating transformer is substantially independent of battery voltage, the peak current in the inductor 13 may to some extent be dependent on battery voltage, which is undesirable. This can be overcome by including additional voltage dropping components in series with the collector-emitter path of the transistor 22. A resistor and a pair of diodes in series have been found suitable for this purpose. In the case of FIGURE 3, however, the problem can be overcome by connecting the resistor 42 and winding 43 in series with a further diode across the inductor 13 and diode 14. In this case the resistor 42 is essential. It must be noted that for many applications these refinements are not required, because the variations in peak current through the inductor 13 with battery voltage are sufficiently small to be ignored.

In each example, temperature-compensation may be provided, either by the design of the saturating transformer or by the use of suitable temperature-sensitive components in the circuit.

In a modification applicable to each of the circuits described, the inductor 13 forms the primary winding of a drive transformer the secondary winding of which has one end connected to the cathode of the switch 15 and its other end connected to the gate of the switch 15 through a diode and a resistor in series. The drive transformer provides feedback assisting in turning the switch on, so that only a small current is required from the drive circuit to start conduction of switch 15.

The circuit shown in FIGURE 4 is particularly suitable for very low battery voltages. As shown the circuit is a modification of FIGURE 1, but the same modification can be applied to FIGURES 2 and 3. The resistor 16 has been replaced by a diode 51, and moreover the gate and cathode of the switch 15 are interconnected through the secondary winding 52 of a transformer 53 the primary winding of which is connected between the line 11 and the collector of a transistor 55, having its emitter connected to the line 12 through a resistor 56 and its base connected to the collector of a transistor 57. The transistor 57 has its emitter connected to the line 12, its collector connected to the line 11 through a resistor 58, and its base connected through resistors 59, 61, 62 respectively to the line 11, the emitter of the transistor 55 and the collector of the transistor 22.

The diode 51 prevents the transformer 19 from turning the switch 15 on, but when the transistor 22 conducts, current flow in the transistor 57 is reduced by virtue of the connection through the resistor 62 and the transistor 55 starts to conduct. The result of this is that a pulse of current is fed through the transformer 53 while the transistor 22 conducts. The circuit including the transistors 55, 57 is designed to ensure that the amplitude of this pulse is independent of battery voltage and the transformer 53 provides a substantially constant gate-cathode current to the switch 15 to turn it on. The switch 15 is turned off as in FIGURE 1, and when the transistor 22 ceases to conduct the transistors 55, 57 become non-conductive and conductive respectively.

As previously explained, a transistor can be used in place of a gate controlled switch, it then being necessary to ensure that the transistor remains saturated while it is on. This can be done by ensuring that sufficient base current is provided to saturate the transistor at any expected collector-emitter currents or by incorporating a transformer to increase the base drive with increasing collector-emitter current. In the examples shown, current is provided to turn off the gate controlled switch, and it will be understood that where a transistor is used the removal of the drive current would be sufficient to stop the transistor conducting. However, the use of the circuits is advantageous even with a transistor, because the reverse base-emitter bias ensures that the transistor switches off rapidly.

Having thus described our invention what we claim as new and desire to secure by Letters Patent is:

1. A spark ignition system for an internal combustion engine comprising in combination a D.C. source, a semiconductor switch, said semi-conductor switch having a control terminal, and a pair of main terminals, signal supplied to the control terminal determining whether or not the switch conducts current between said pair of main terminals, a series circuit connected across said D.C. source, said series circuit including an inductor, a diode and the main terminals of said semi-conductor switch, energy being stored in said inductor when said semi-conductor switch is on, a capacitor connected in a series circuit across the main terminals of said semi-conductor switch, means operable in timed relationship to the engine for applying signals to the control terminal of said semi-conductor switch, at the instants when a spark is required, to turn said semi-conductor switch on and permit said capacitor to discharge through the main terminals of said semi-conductor switch, means whereby in use discharge of the capacitor through said main terminals of said semi-conductor switch produces a spark, a saturable transformer, means connecting said saturable transformer in said system whereby current flows in the primary winding of said saturable transformer when said switch is turned on, and means operable when the saturable transformer saturates for turning said switch off by varying the signal applied to its control terminal, said saturable transformer ensuring that said switch is always turned off when the current flowing in said series circuit has a predetermined value, the energy stored in said inductor when said semi-conductor switch is on serving to charge said capacitor when said semi-conductor switch is off, and said diode preventing discharge of said capacitor through said inductor.

2. A system as claimed in claim 1 in which said means operable in timed relationship to the engine includes a bistable circuit which when a spark is required is driven by a pulse derived from the engine from a first state to a second state in which the semi-conductor switch is turned on, saturation of said transformer causing the bistable circuit to be driven back to its first state, and revertion of the bistable circuit to its first state causing the semi-conductor switch to be turned off.

3. A system as claimed in claim 2 in which the bistable circuit includes a transistor the collector and emitter of which are connected across the battery in series with the primary winding of a control transformer the secondary winding of which is connected between the control terminal and one of the main terminals of the semi-conductor switch, the transistor conducting only when the bistable circuit is in its first state, and the voltage induced in the secondary winding when the bistable circuit reverts to its first state turning the gate controlled switch off.

4. A system as claimed in claim 3 in which the control transformer is the saturable transformer.

5. A system as claimed in claim 3 in which the control transformer is a separate transformer having its primary winding in parallel with the primary winding of the saturable transformer.

6. A system as claimed in claim 3 including means for dissipating excess energy stored in the secondary winding of the control transformer after the semi-conductor switch is turned off.

7. A system as claimed in claim 3 in which the transistor is bottomed until the saturable transfromer saturates, at which point the collector-emitter voltage of the transistor rises, this rise in voltage serving to drive the bistable circuit back to its first state.

8. A system as claimed in claim 3 in which a feedback winding on the saturable transfromer maintains the transistor bottomed until the saturable transformer saturates, at which point the feedback ceases and the bistable circuit reverts to its first state.

9. A system as claimed in claim 3 in which the control transformer also supplies current to turn the semiconductor switch on when the transistor conducts.

10. A system as claimed in claim 3 in which the control transformer does not turn the semi-conductor switch on, but the bistable circuit controls a second bistable circuit which acts through a further transformer to turn the semi-conductor switch on, the further transformer and its associated transformer being designed to provide to the control terminal a pulse of amplitude substantially independent of battery voltage.

11. A system as claimed in claim 3 including additional voltage dropping components in series with the primary winding of the saturable transformer, the additional components ensuring that the voltages across the inductor and the primary winding of the saturable transformer rise at substantially the same rate.

12. A system as claimed in claim 1 in which the semi-conductor switch is a gate controlled switch.

13. A system as claimed in claim 1 in which the semi-conductor switch is a transistor.

14. A system as claimed in claim 1 in which the core of the saturable transformer is formed with an air gap.

15. A system as claimed in claim 1 including resistors which render the operation of the system substantially independent of temperature.

References Cited
UNITED STATES PATENTS

| | | | |
|---|---|---|---|
| 2,847,489 | 8/1958 | Short et al. | 123—148 |
| 3,263,124 | 7/1966 | Stuermer | 315—209 |
| 3,271,593 | 9/1966 | De Vilbiss | 123—148 |
| 3,312,211 | 4/1967 | Boyer | 123—148 |
| 3,318,296 | 5/1967 | Hufton | 123—148 |

LAURENCE M. GOODRIDGE, *Primary Examiner.*